June 24, 1930. A. C. HOUGLAND 1,766,176
DRIVING MECHANISM FOR BUTTER WORKING ROLLS
Original Filed Dec. 22, 1927
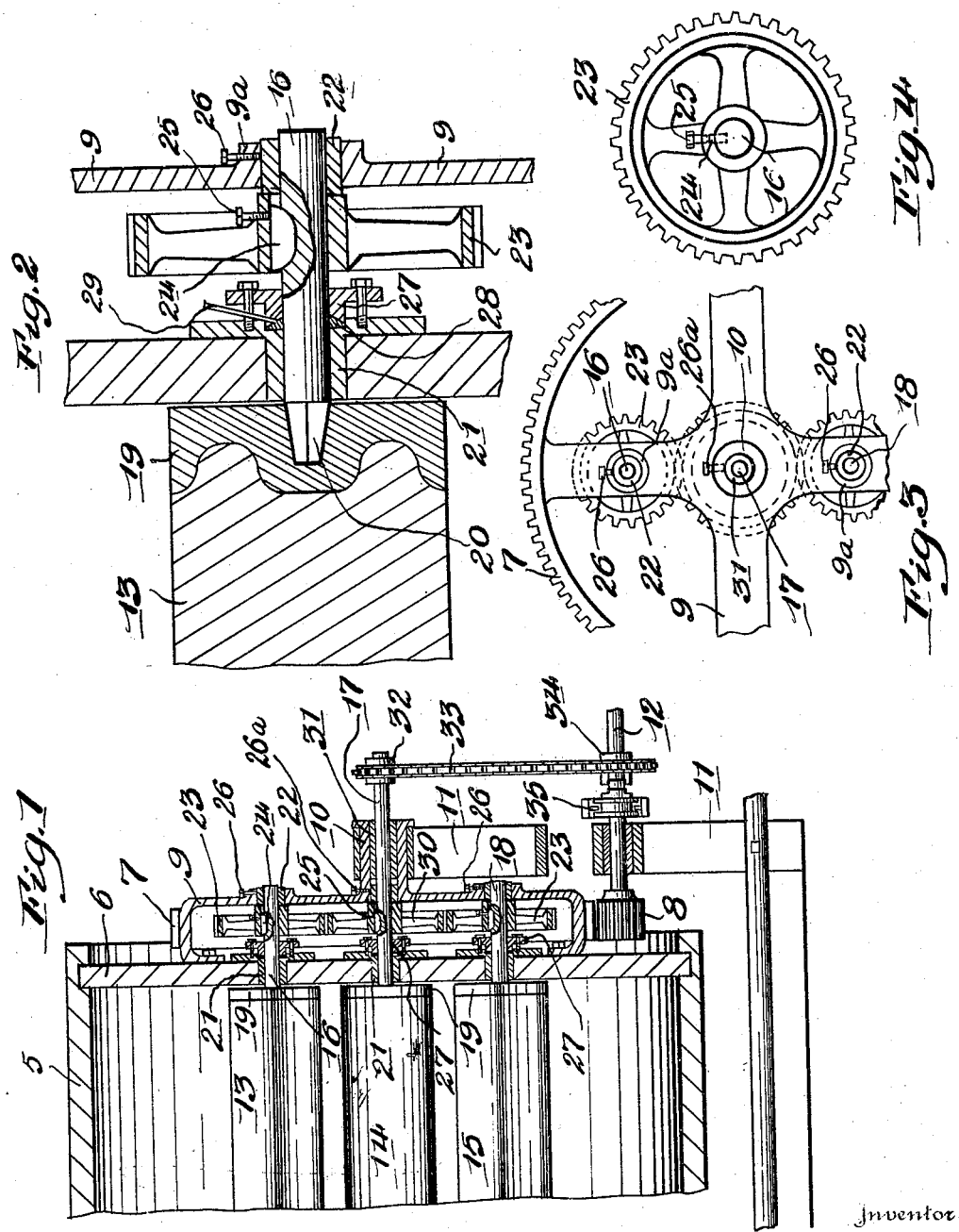
Inventor
Albert C. Hougland
By Stryker & Stryker
Attorneys Patented June 24, 1930

1,766,176

UNITED STATES PATENT OFFICE

ALBERT C. HOUGLAND, OF ST. PAUL, MINNESOTA, ASSIGNOR TO CRANE COMPANY OF MINNESOTA, OF ST. PAUL, MINNESOTA, A CORPORATION OF MINNESOTA

DRIVING MECHANISM FOR BUTTER-WORKING ROLLS

Application filed December 22, 1927, Serial No. 241,844. Renewed May 10, 1930.

This invention relates to churns and particularly to the driving mechanism for butter working rolls of the large or commercial type of churns. It is my object to facilitate assembling such churns and making adjustments thereon such as those required to compensate for wear between the butter working rolls and drive shaft and to generally improve the construction and arrangement of the driving mechanism. This invention also includes certain other novel features of construction which will be more fully pointed out in the following specification and claims.

Referring to the drawings, which illustrate one form of my invention, Figure 1 is a central longitudinal section through the driving end of a churn showing my invention thereon; Fig. 2 is an enlarged detail of my improvements in vertical section; Fig. 3 is a fragmentary end view of the drive shafts for the butter working rolls together with their supports and Fig. 4 is a detail elevation of one of the drive gears and shaft.

In the drawings I have used the numeral 5 to indicate a large cylindrical churn adapted to be rotated upon a horizontal axis and having an end wall or head 6. Mounted upon the outer surface of the end 6 is a large ring gear 7 which is concentric with the axis of the churn and arranged to be driven by a pinion 8 to rotate the churn about its axis. Integral with the ring gear 7, and in spaced relation to the head 6 of the churn, is a spider 9 formed with a large hub 10. This hub is journaled in the upper extremity of a standard 11 for supporting the churn. A shaft 12 for operating the pinion 8 is also journaled in the standard 11.

Butter working rolls 13, 14 and 15 of well known construction are mounted within the churn 5. These rolls are provided with axial driving shafts 16, 17 and 18 respectively which extend through suitable journal bearings in the head 6. Each of the rolls 13, 14 and 15 has a metal ferrule 19 upon its end and this ferrule is formed with a central socket arranged to receive a tapered end 20 upon the corresponding drive shaft. In cross section the ends 20 are angular, preferably square, so as to transmit torque to the butter making rolls. As the drive shafts 16 and 18 are identical only one will be described in detail. Thus as shown in Fig. 2 the drive shaft 16 has a bearing 21 in the head 6 and another bearing 22 in the spider 9. Between the bearings 21 and 22 the shaft 16 is fitted with a drive gear 23, being connected therewith by a moon shaped key 24 of common type. This key fits into a longitudinally arcuate slot in the shaft 16 and projects from the periphery of said shaft into a longitudinal keyway in the gear hub. To retain the gear 23 against longitudinal sliding movement upon the shaft 16 I provide a set screw 25 extending through the hub of the gear and impinging at its inner end against said key. To permit withdrawal of the shaft 16 with the key 24 in place therein, I make the bearing 22 removable from the spider 9 and normally hold the bearing in place by means of a set screw 26. The latter set screw extends through an outwardly projecting hub 9$^a$ on the spider 9. The bearings 22 are soft metal parts of sleeve shape with their outer peripheries of sufficiently large diameter to permit withdrawal of the shafts 16 and 18 with the keys 24 projecting from the periphery thereof.

To prevent leakage of brine or milk from the churn the bearings 21 are provided with packing glands 27 and suitable compressible packing 28. This packing may be lubricated through a small tube 29 which is fixed in the gland 27. The driving shaft 17 for the central butter working roll 14 is provided with a gear 30 in the space between the spider 9 and head 6, this gear being arranged to mesh with the gears 23 for driving the shafts 16 and 18. The shaft 17 also projects through a central bearing 31 in the hub 10 and has a drive sprocket 32 fixed on its outer end. A set screw 25 normally holds the gear 30 on its shaft and another set screw 26$^a$ adjustably holds the bearing 31 on the hub 10. Thus the bearing 31, like the bearings 22, is readily removable with the shaft 17, as well as longitudinally adjustable in the support, when its set screw 26$^a$ is loose and the shaft 17 may be withdrawn with its key 24 projecting from its periphery. The sprocket wheel 32 is arranged to be driven by a chain 33 from a sprocket wheel 34 upon the shaft 12. A suitable clutch 35 is provided to connect and disconnect the sprocket wheel 34 and shaft 17. This clutch 35 may be of any suitable or well known construction.

*Operation*

In operation power is applied to the shaft 12 for turning the churn through the pinion 8 and ring gear 7. When the butter working rolls are to be operated the clutch 35 is moved to connect the sprocket wheel 34 with the shaft 12 and thus drive the shaft 17 through the chain 33 and sprocket wheel 32. The shaft 17, being connected by one of the keys 24 to the gear 30, rotates said gear and the butter working roll 14. As will be readily understood, the butter working rolls 13 and 15 are driven through the gears 30 and 23 and shafts 16 and 18 respectively. It is to be further understood that in operation the outer faces of the hubs of the gears 23 and 30 abut against the inner surfaces of the bearings 22 and 31 to retain the tapered ends 20 in firm engagement with the butter working rolls.

After continued use, wear may occur between the ferrules 19 and tapered ends 20 of the drive shafts for the butter working rolls. To compensate for this and take up the resulting play with my invention it is only necessary to loosen the set screws 25, 26 and 26ª and to move the shafts 16, 17 and 18, together with their bearings 22 and 31, longitudinally inward. If it becomes necessary to remove a roll or its drive gear, as for repairs or otherwise, the set screws 25 and 26 or 26ª are merely loosened. Now the shafts 16, 17 and 18 may be removed from the churn together with the keys 24 and bearings 22 and 31 in the spider 9. This also releases the butter working rolls and driving gears 23 and 31. Now these drive gears may be readily removed between the arms of the spider 9. As will be readily understood the butter working rolls and drive shafts may be assembled by reversing the operation above described. Finally to make the parts secure the set screws 25, 26 and 26ª are merely tightened to prevent longitudinal movement of the drive shafts relative to their gears and to retain the bearings 22 and 31 in the spider. Thus the present invention greatly facilitates assembling the churns as well as making repairs and adjustments for wear.

Having described my invention what I claim as new and desire to protect by Letters Patent is:

1. In a churn having a butter working element, a drive shaft for said element and a support for said shaft disposed in spaced relation to the outer surface of the churn, the combination of means on the inner end of said drive shaft adapted to engage said element for turning the same, a drive gear mounted on said shaft between said support and outer wall of the churn, a key operatively connecting said gear and shaft, removable means for preventing longitudinal movement of said gear on said shaft, a removable bearing for said shaft in said support and removable means for retaining said bearing in said support, said bearing being formed to permit longitudinal removal of said shaft with said key in place thereon.

2. In a churn having a butter working element, a drive shaft for said element and a support for said shaft mounted in spaced relation to the outer surface of the churn, the combination of an end of said drive shaft adapted to engage said element for driving the same, a drive gear mounted on said shaft between said support and outer surface of the churn, a hub on said gear, a key operatively connecting said gear and shaft, a set screw arranged in said hub to prevent longitudinal movement of said gear on said shaft, a removable bearing in said support and a set screw arranged to retain said bearing in said support, said bearing being formed to permit longitudinal removal of said shaft with said key in place thereon upon the loosening of said set screws.

3. In a churn having a butter working element, a drive shaft for said element and a support for said shaft disposed in spaced relation to the outer surface of the churn, the combination of means on the inner end of said drive shaft adapted to engage said element for turning the same, a drive gear mounted on said shaft between said support and outer wall of the churn, means operatively connecting said gear and shaft, removable means for preventing longitudinal movement of said gear on said shaft and a bearing for said shaft in said support formed to permit longitudinal removal of said shaft without removing said support.

4. In a churn having a butter working element, a drive shaft for said element and a support for said shaft disposed in spaced relation to the outer surface of the churn, the combination of means on the inner end of said drive shaft adapted to engage said element for turning the same, a drive gear mounted on said shaft between said support and outer wall of the churn, means operatively connecting said gear and shaft, removable means for preventing longitudinal movement of said gear on said shaft, an abutment for the outer face of said gear on said support, said abutment being adjustable longitudinally relative to said shaft, and means for securing said abutment in predetermined positions on said support.

5. The combination specified in claim 1 which the drive shaft is formed with a longitudinally tapered end and the element is formed with a socket adapted to removably receive said end.

6. The combination specified in claim 2 in which the hub on said gear normally abuts against the inner surface of the bearing for the shaft in said support and said bearing is adjustable longitudinally relative to said shaft.

In testimony whereof, I have hereunto signed my name to this specification.

ALBERT C. HOUGLAND.